F. J. METZGER.
SYNTHETIC PRODUCTION OF AMMONIA.
APPLICATION FILED JUNE 12, 1918.
1,313,314.
Patented Aug. 19, 1919.
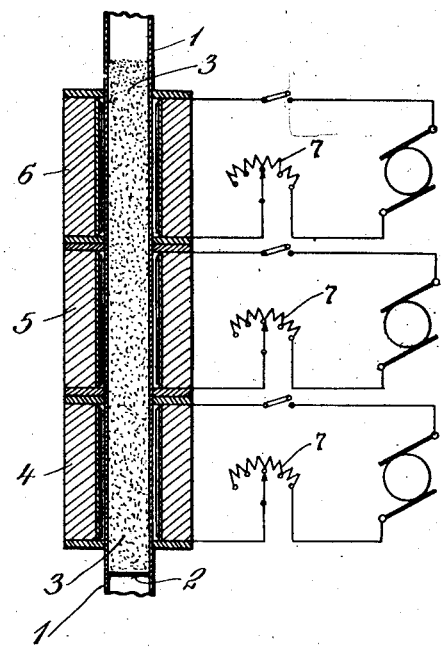
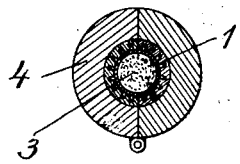
Inventor:
Floyd J. Metzger,
By his Attorneys

UNITED STATES PATENT OFFICE.

FLOYD J. METZGER, OF NEW YORK, N. Y.

SYNTHETIC PRODUCTION OF AMMONIA.

1,313,314.  Specification of Letters Patent.  Patented Aug. 19, 1919.

Application filed June 12, 1918. Serial No. 239,577.

*To all whom it may concern:*

Be it known that I, FLOYD J. METZGER, a citizen of the United States, residing at New York city, in the county of New York, State of New York, have invented certain new and useful Improvements in Synthetic Production of Ammonia; and I do hereby declare the following to be a full, clear, and exact description of the invention, such as will enable others skilled in the art to which it appertains to make and use the same.

My invention relates to the production of ammonia synthetically by the direct combination of nitrogen and hydrogen while both are in a gaseous state, and with the aid or through the intervention of contact substances or catalyzers.

More particularly, my invention relates to catalytic processes for the synthetic production of ammonia which can be practised with increased efficiency and prolonged action of the catalyzers employed, and with resulting advantage to the ammonia production.

It is known that certain elements or compounds, or mixtures thereof, are especially active as catalyzers in effecting the combination of nitrogen and hydrogen, in a gaseous state, in the production of ammonia. The life of such sensitive catalyzers, however, in processes heretofore proposed, has been comparatively short, since, although the sensitive catalyzers may be very active when first introduced, they rapidly become less and less efficient, and, in the course of a comparatively short time, are impaired to such an extent as to be of little or no value for the commercial production of ammonia.

Because of the short life of such catalyzers, and their rapid depreciation, it has not been found industrially practicable heretofore, in so far as I am aware, to employ these highly active or sensitive catalyzers for the production of ammonia. Instead, other catalyzers have been resorted to, which, though less active, possess a longer life, and, accordingly, make possible the continuation of the catalytic process for a longer period of time.

The present invention relates more particularly to a process or processes in which the catalyzers employed are highly active catalyzers and catalyzers especially sensitive to catalyzer poisons. Among such catalyzers may be mentioned cerium, and the so-called "rare earth" elements including lanthanum, neodymium, praseodymium, ytterbium, yttrium, zirconium and the like, or compounds, mixtures or alloys of these elements; also uranium, vanadium, niobium, tantalum, and the like, or their compounds, mixtures or alloys.

According to the present invention, these active and sensitive catalyzers are maintained in a relatively high state of efficiency and without any considerable depreciation for materially longer periods of time than has heretofore been possible, in so far as I am aware; so that the sensitive catalyzers, which have heretofore been regarded as uneconomical, can nevertheless be employed with a high degree of efficiency, and with corresponding prolongation of the catalytic process and increase in the amount of ammonia produced.

The process of the present invention is, however, also of advantage in connection with the utilization of other catalyzers such as iron, nickel, cobalt, manganese, titanium, chromium, molybdenum, tungsten and the like, their alloys, compounds or mixtures; or when any of these catalyzers or any of the other catalyzers above referred to are used in admixture with or in conjunction with the alkali metals or the alkaline earth metals or their compounds.

It will accordingly be understood that the invention is of more or less general application in connection with many different catalyzers which are available for the catalytic production of ammonia, even where the catalyzers possess less catalytic activity than is possessed by the more active and sensitive catalyzers above referred to. The invention, however, is of especial advantage in connection with such sensitive and more active catalyzers, as above pointed out, since the common objections to the use of those sensitive catalyzers, such as rapid depreciation and short life, are largely overcome, and these highly active catalyzers can be made available for prolonged periods of time and with retention of their high catalytic activity.

In the catalytic production of ammonia from nitrogen and hydrogen, it has been the custom heretofore, in so far as I am aware, to determine or establish experimentally, as nearly as possible, the exact temperature at which optimum results could be obtained with any given catalyzer; and then to carry out the catalytic process at this predetermined temperature and with as little deviation as possible therefrom.

I have discovered that such maintenance of the temperature as nearly as possible at any fixed point, during the catalytic process, is undesirable; and I have also discovered and proven, by many investigations extending over considerable periods of time, that the catalytic production of ammonia can be carried out with materially increased advantage by causing the temperature to oscillate, that is, to fall and rise during the course or progress of the reaction, or while the nitrogen and hydrogen are in contact with the catalyzer substance.

The terms "oscillate" and "oscillation" as hereinafter used, are intended and understood to refer to the fall and rise of temperature, during the catalytic process.

The oscillation, or fall and rise of the temperature, can be varied, both as to frequency of the oscillation and as to the temperature range. In my investigations, I have used temperature oscillations covering the range between ordinary room temperature and approximately 750° C. which latter temperature is usually regarded as the optimum for ammonia catalysis. For maximum results, however, I have found that the lower point in the range of oscillating temperatures should be, in general, above 100° C. With some catalyzers, indeed, it is more advantageous, for various reasons, to carry out the entire process at much lower temperatures than 750° C. and, accordingly, to cause the temperature oscillations to take place between such lower temperatures. The extreme range of oscillation above noted (i. e., between ordinary room temperature and 750° C.) may therefore be varied, and, in fact, temperature oscillations of 100° C. or even 50° C. or 25° C. may be employed with useful results. The frequency of the oscillations will depend mainly upon the length of time that the catalyzer is found to maintain its efficiency at the upper limit of the range of oscillation; that is to say, as soon as its catalytic efficiency, at the upper limit selected, becomes materially impaired, the oscillations should be brought into effect.

It will accordingly be evident that the process can be practised with many variations, not only as regards particular catalyzers, or mixture of catalyzers to be employed, but also as regards the average temperature of the process, the range of temperature oscillations, the frequency of these oscillations, and other considerations.

It will be evident also that many forms and types of apparatus and equipment are available for the practising of the present invention, which will enable the necessary contact between the catalyzer and the gases to be brought about and which will enable the proper temperature and the temperature oscillations to be obtained. The catalyzer may be in the form of a stationary body, through which or into contact with which the reacting gases are passed; or the catalyzer may be carried by a liquid vehicle and circulated through an apparatus through which the reacting gases are likewise circulated, so that the gases are brought into contact with the catalyst at the desired temperature and with the desired variations in the temperature. I have successfully employed apparatus in which the desired temperature and temperature oscillations were obtained by electrically heated devices, and also where they have been obtained by gas heated apparatus.

The invention will be further described in connection with a specific example or embodiment thereof, but it will be understood that many alternatives are possible without departing from the spirit and scope of the invention.

Example: The catalyzer material may be prepared from cerium or an alloy of rare earth metals ("mischmetall"), by first converting the same into the nitrid or hydrid, or into a mixture of nitrid and hydrid. With such a catalyzer I have found that, as the temperature in the reaction chamber rises, there is a gradual increase in the conversion of the mixed gases into ammonia. If, however, the temperature is maintained constant at a given point, for example, about 200° C., the amount of ammonia produced will gradually, and sometimes rapidly, diminish to a point where only traces of ammonia are produced. If, however, the temperature is then allowed to fall from 200° C. to say 100° C. and to rise again gradually to 200° C. there will be a renewed production of ammonia, substantially equal to that formed during the first rise in temperature. If the temperature is again held at 200° C. there results a diminution of the ammonia production, as was the case in the first instance; but by again lowering the temperature to 100° C. and then again raising it, a further production of ammonia can be effected with repetition of the results above described.

I have repeated the temperature oscillations, such as those above described, many hundreds of times, and over long periods of time without being able to detect any depreciation in the activity or effectiveness of the catalyzer.

Instead of using the temperatures specifically referred to above, many other temperatures and temperature ranges may be used. Those described above have been selected from many investigations where the same general results have been obtained with the same and other temperature ranges.

In the accompanying drawing I have illustrated one form of apparatus adapted to the practice of the present invention, although it will be understood that various types of apparatus, of the same or different character, are available for the purpose.

In the drawing, Figure 1 is a vertical section through the furnace, showing also the electrical heating means, and Fig. 2 is a section taken on a horizontal plane through one of the furnace elements.

The apparatus illustrated in the accompanying drawings is electrically heated, so that the desired temperatures and temperature oscillations may be readily obtained by variation and regulation of the electrically generated heat.

The apparatus is made up of the furnace chamber 1, in the form of a vertical cylinder or tube, in which the catalyzer 3 may be supported upon a perforated plate, screen, or grid 2. The catalyzer may be in a more or less finely divided form or it may be mounted upon a suitable support or carrier for increasing its surface. It should be of a physical character which will permit the reacting gases to pass therethrough. The furnace chamber is surrounded by the separate heating units 4, 5 and 6, each of which is provided with independent or independently regulated heating means. The several heating units or furnace elements 4, 5 and 6 may conveniently be made in two parts hinged together as shown in Fig. 2, so that they may be opened to expose the walls of the furnace chamber 1 and thereby permit radiation and enable the cooling to take place more rapidly.

Each of the heating units or elements 4, 5 and 6 may be heated and regulated independently, either by using different sources of energy for heating, or by using the same source of energy and regulating the heating effect in any well known manner, for example, by discontinuing the heat when desired, or by regulating the heat by means of rheostats 7 or otherwise. With this heating arrangement it will be evident that different parts of the furnace chamber can be heated to different temperatures simply by regulating the heating effect. Thus, for example, the oscillations of the temperature may be effected by first heating the entire furnace chamber so as to bring the entire catalyzer body up to the desired upper temperature limit chosen, maintaining it thereat until the efficiency of the catalyzer tends to become impaired, then cooling the furnace chamber and catalyzer body to the predetermined lower temperature limit, and again raising the temperature to the upper limit as before; or, the temperature oscillations may be brought about independently at different parts of the furnace chamber, for example, in such manner that there will always be a part of the charge at the optimum temperature, while the temperature at the other parts of the charge is being caused to oscillate. In this manner, while the temperature of each part of the catalyzer body will be oscillated to restore or renew its catalytic activity, the temperature oscillations of the several parts will occur in such sequence that there will always be maintained at some portion of the mass a zone of optimum activity.

With such an electrically heated furnace as that illustrated and described, any desired temperature can quickly be obtained, and the temperature of the furnace chamber and catalyzer can be varied, controlled and oscillated by means of the rheostats. The cooling of the furnace chamber and catalyzer can also be readily effected by shutting off the current and by opening the heating elements so that radiation from the tube 1 will take place.

While I have illustrated one type of apparatus well adapted to the practice of the process of the present invention, it will be understood that such description and illustration is for purposes of illustrating the process and that this process is not limited to any particular form of apparatus, but may be practised with any suitable apparatus capable of raising the catalyzer to the desired temperature and producing the desired temperature oscillations.

In my companion application, Serial No. 239,578, filed of even date herewith, I have described and illustrated a specific embodiment of the general process of the present invention in which the catalyzer is suspended in an organic liquid such as paraffin and circulated through the reaction apparatus where it is brought into contact with the reacting gases. Where such a catalyzer is used in suspension in paraffin or similar liquid vehicle, the temperature oscillations may be obtained by varying the temperature in the reaction chamber, or such variations may be supplemented or substituted by variations in the temperature of the liquid and its contained catalyzer while it is being circulated outside the reaction chamber and before it is returned again to this chamber. This specific embodiment of the general process of the present invention is not claimed specifically herein, inasmuch as it is more fully described and specifically claimed in said companion application.

The gases which are used in the catalytic production of ammonia, according to the present invention, may be those commonly used for the synthetic production of ammonia; that is, the nitrogen and hydrogen may be used in a substantially pure form, or they may be admixed with other gases which are not prejudicial to the catalytic reaction.

Although it is not necessary, in the practice of the present invention, to employ the exceedingly high pressures proposed in prior processes for the production of synthetic ammonia from nitrogen and hydrogen gas mixtures, it will nevertheless be understood that relatively high pressures will, in most cases, be desirable,—say, even up to fifty to two hundred atmospheres. In fact, even higher pressures may be employed, but usually without compensating benefit.

I claim:

1. In the catalytic production of ammonia from nitrogen and hydrogen, the method of operating at high efficiency, which comprises changing the temperature during the reaction period to restore the catalyzer.

2. In the catalytic production of ammonia from nitrogen and hydrogen, the method of operating at high efficiency, which comprises changing the temperature at recurring intervals during the reaction period to restore the catalyzer.

3. In the catalytic production of ammonia from nitrogen and hydrogen, the method of prolonging the efficiency of catalyzers having a short period of efficiency at the temperature of optimum activity, which comprises causing the temperature to rise, fall, and rise again, and thereafter to periodically fall and rise.

4. The method of producing ammonia synthetically, which comprises causing a mixture of hydrogen and nitrogen gases to contact with a catalyzer at a temperature appropriate to the catalytic production of ammonia, and periodically causing the temperature of the catalyzer to oscillate.

5. The method of producing ammonia synthetically, which comprises circulating a mixture of hydrogen and nitrogen gases into contact with a suitable catalyzer at a temperature appropriate to catalytic production of ammonia, and periodically causing the temperature of the catalyzer to oscillate.

6. The method of producing ammonia synthetically, which comprises circulating a mixture of hydrogen and nitrogen gases into contact with a suitable catalyzer at a temperature appropriate to the catalytic production of ammonia, and periodically causing the temperature of the gases and of the catalyzer to oscillate.

7. The method of producing ammonia synthetically, which comprises bringing a mixture of hydrogen and nitrogen gases into contact with a suitable catalyzer at a predetermined temperature of optimum activity and maintaining such temperature until the rate of ammonia production has been materially reduced and causing the temperature of the catalyzer to oscillate from said temperature.

8. The method of producing ammonia synthetically, which comprises bringing a mixture of hydrogen and nitrogen gases into contact with a stationary body of catalyzer, and causing the temperature of said catalyzer to oscillate periodically during the reaction.

9. The method of producing ammonia synthetically, which comprises passing a mixture of hydrogen and nitrogen gases through a catalyzer, periodically maintaining different parts of said body of catalyzer successively at a temperature of high catalytic activity, and causing the temperature of all parts of said catalytic body to oscillate periodically in like succession.

10. The method of producing ammonia synthetically, which comprises passing a mixture of hydrogen and nitrogen gases through a catalyzer, separately heating different portions of said catalyzer body, and causing the temperature of the different portions of the body to oscillate periodically at different times, whereby the gases are caused to circulate in contact with different portions of the catalyzer body at different temperatures.

11. The method of producing ammonia synthetically, which comprises passing a mixture of nitrogen and hydrogen gases through a catalyzer, independently heating different parts of said catalyzer body, temporarily maintaining a part of said catalyzer body at a temperature of high catalytic activity, simultaneously causing the temperature of another part of said body to oscillate, and subsequently maintaining said other part of the catalytic body at a temperature of high catalytic activity while the temperature of the first part is caused to oscillate.

12. The method of producing ammonia synthetically, which comprises bringing a mixture of hydrogen and nitrogen gases into contact with a suitable catalyzer, gradually raising the catalyzer to a temperature of high activity, maintaining the catalyzer at such temperature until the catalytic activity has appreciably decreased, subsequently lowering the temperature over a comparatively wide range, and again raising the temperature of the catalyzer to a temperature of high activity.

13. In the production of ammonia synthetically, according to the procedure as defined in claim 1, the carrying on of said procedure at super-atmospheric pressure.

14. In the production of ammonia synthetically according to the procedure as defined in claim 8, the carrying on of said procedure at super-atmospheric pressure.

In testimony whereof I affix my signature.

FLOYD J. METZGER.